G. H. BRYANT & A. ZIESING.
CAR WHEEL.
APPLICATION FILED OCT. 7, 1909.
974,549.
Patented Nov. 1, 1910.
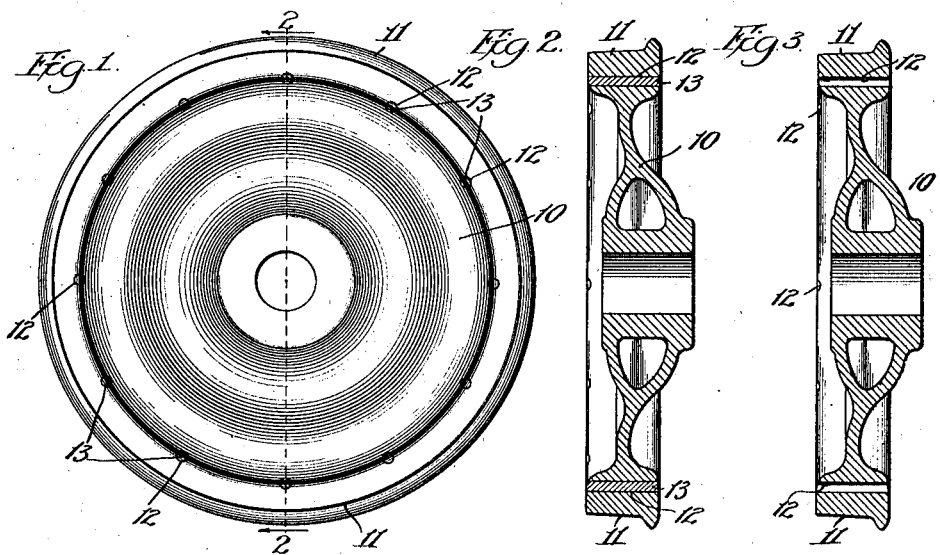
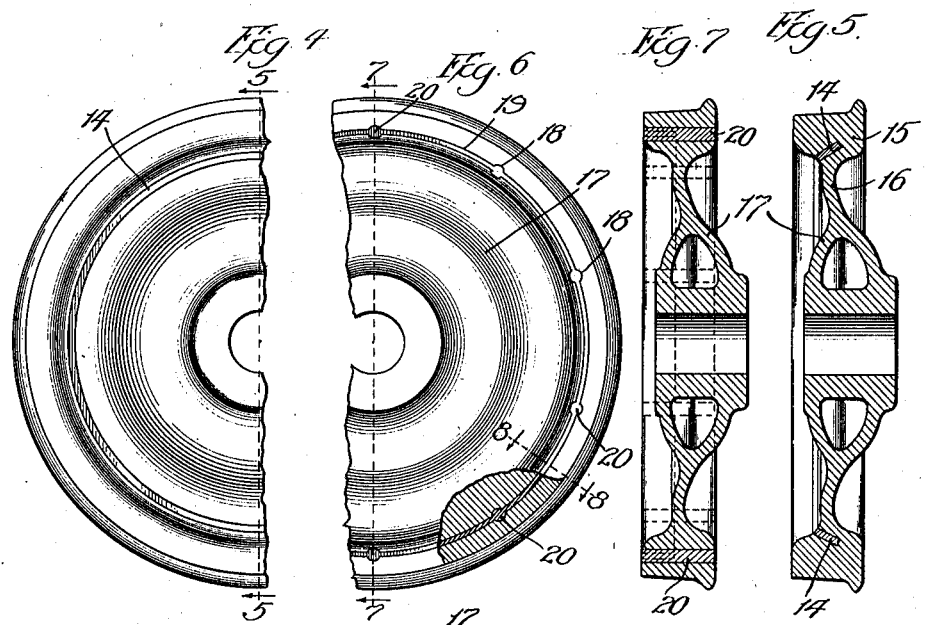
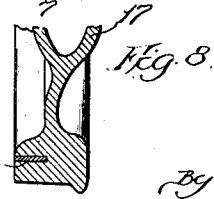

UNITED STATES PATENT OFFICE.

GEORGE H. BRYANT AND AUGUST ZIESING, OF CHICAGO, ILLINOIS.

CAR-WHEEL.

974,549.    Specification of Letters Patent.    Patented Nov. 1, 1910.

Application filed October 7, 1909. Serial No. 521,527.

*To all whom it may concern:*

Be it known that we, GEORGE H. BRYANT and AUGUST ZIESING, both citizens of the United States, residing at Chicago, in the county of Cook and State of Illinois, have jointly invented certain new and useful Improvements in Car-Wheels, of which the following is a specification.

The elimination or diminution of the noise of operation of cars, especially street railway cars, constitutes the leading aim and object of this invention, the latter applying more particularly, though not exclusively, to cast or rolled car-wheels having their rims or tread portions integral with the main body or central part of the wheel. To this end such wheels are provided or supplied with inserts of non-resonant material or metal, such as lead, to prevent or diminish the transmission of sound vibrations from the rim to the main part of the wheel and axle.

In the accompanying drawing several embodiments of this invention have been illustrated, and in this drawing—

Figure 1 is a face view of a car-wheel having one style or form of the noise-deadening feature; Fig. 2 is a section of the car-wheel of Fig. 1 on line 2—2; Fig. 3 is a section similar to Fig. 2 showing the use of air for a noise deadener; Fig. 4 is a fragmentary elevation of a modified form of car-wheel; Fig. 5 is a section through the same on line 5—5 of Fig. 4; Fig. 6 is a fragmentary elevation on another style of car-wheel; Fig. 7 is a section through the same on line 7—7 of Fig. 6; and Fig. 8 is a section on line 8—8 of Fig. 6.

By reference to these drawings, and particularly to the embodiment of Figs. 1 and 2, it will be noted that a cast-metal car-wheel 10 is shown having integral therewith a rim or tread portion 11, and in order to prevent the transmission of sound vibrations from this rim to the main body or central portion of the wheel and the axle on which it is mounted, there is provided a plurality of apertures 12 extended through the wheel near the base or inner portion of the rim or tread 11, such apertures in this particular embodiment being filled with cores or inserts of lead or other similar non-resonant metal 13. It has been found that the vibrations which produce the sound and which act to a considerable extent to cause the detrimental crystallization of the car-wheel axles travels in a spiral direction from the rim or tread portion inwardly to the central section of the wheel, and by placing such inserts of non-resonant metal in the spiral path of travel of such vibrations their progress and transmission from the rim to the main body of the wheel is eliminated or greatly diminished. Experiments have shown that a construction of this kind acts efficiently to secure the desired result. It is not necessary, however, that such holes or recesses shall be filled with metal, since air itself is a fairly efficient sound deadener, and, therefore, in Fig. 3 there is shown a modification in which the recesses 12 are left open and contain no inserts or fillers.

It is not necessary or essential that the cavities containing the non-resonant material or metal shall extend completely through the wheels, and in Figs. 4 and 5 there is illustrated a different form of wheel having on one side an inwardly-extended annular groove 14 which leaves a space 15 between its inner edge and the opposite face of the wheel of a cross-section not less than that of the web or central part 16 of the wheel. A device of this kind is also found to effectively diminish the vibration and lessen the noise of the traveling wheel. By such a disposition of the groove and the apertures 12 of the other figures, the tread or rim of the wheel may be worn down a considerable extent without interfering with the noise deadening characteristics.

In Figs. 6, 7 and 8 a different form of wheel 17 is shown, the noise deadening construction of which constitutes a sort of combination of the constructions of Figs. 3 and 5. In other words, spaced apertures 18 extend through the wheel at the base of the rim, such holes being connected by a groove 19 of much the same form as that shown in Fig. 5, this groove and the holes which it connects being preferably filled with a body 20 of lead or similar material not capable of rapidly transmitting sound, though, as explained above, such metal may be entirely omitted, in which case the air alone is depended upon to render the wheel non-vibratory.

Whereas in this specification several embodiments of this invention have been indicated, it is to be understood that the invention is not limited and restricted to the precise structural features herein shown, because these may be modified within comparatively wide limits without departure from the heart and essence of the invention. Also the invention is applicable to gear and other wheels to lessen their noise of operation.

We claim:

1. A sound deadened wheel having its rim integral with its central portion and also having one or more cavities in the rim and in the path of sound vibrations containing a non-resonant material, substantially as described.

2. A sound deadened wheel having its rim integral with its central portion and also having one or more cavities in the rim and in the path of sound vibrations containing a non-resonant metal, substantially as described.

3. A wheel having its rim integral with its central portion and also having one or more apertures extended through the wheel near the inner part of the rim, such aperture or apertures containing a non-resonant material, substantially as described.

4. A wheel having its rim integral with its central portion and also having one or more apertures extended through the wheel near the inner part of the rim, such aperture or apertures containing a non-resonant metal, substantially as described.

5. A wheel having its rim integral with its central portion and also having one or more apertures extended through the wheel, said apertures containing a non-resonant material, substantially as described.

6. A wheel having its rim integral with its central portion and also having extended through the wheel a plurality of apertures connected by a groove extended inwardly from one face of the wheel, said apertures and groove containing a non-resonant material, substantially as described.

7. A wheel having its rim integral with its central portion and also having extended through the wheel a plurality of apertures connected by a groove extended inwardly from one face of the wheel, said apertures and groove containing a non-resonant metal, substantially as described.

GEO. H. BRYANT.
AUGUST ZIESING.

Witnesses:
E. M. EVANS,
E. A. SMITH.